United States Patent [19]

Tebbe

[11] Patent Number: 5,041,512

[45] Date of Patent: Aug. 20, 1991

[54] MELT-FORMABLE ORGANOALUMINUM POLYMER

[75] Inventor: Frederick N. Tebbe, Hockessin, Del.

[73] Assignee: E. I. Du Pont de Nemours and Company, Wilmington, Del.

[21] Appl. No.: 338,020

[22] Filed: Apr. 14, 1989

Related U.S. Application Data

[63] Continuation-in-part of Ser. No. 76,182, Jul. 27, 1987, abandoned, which is a continuation-in-part of Ser. No. 903,448, Sep. 4, 1986, Pat. No. 4,696,968.

[51] Int. Cl.[5] .............................................. C08G 79/10
[52] U.S. Cl. ........................................ 528/9; 423/409; 501/96; 501/98; 501/99; 501/100; 524/610
[58] Field of Search ............. 528/9; 524/610; 501/96, 501/99, 98, 100; 423/409

[56] References Cited

U.S. PATENT DOCUMENTS

| 3,505,246 | 4/1970 | Ehrich et al. ............................ 260/2 |
| 3,529,044 | 9/1970 | Santangelo ............................ 264/29 |
| 3,651,112 | 3/1972 | Sinn et al. ........................ 260/448 A |
| 3,658,979 | 4/1972 | Dunn et al. ............................ 264/176 |
| 3,846,527 | 11/1974 | Winter et al. ........................ 264/63 |
| 4,010,233 | 3/1977 | Winter et al. ........................ 264/63 |
| 4,179,459 | 12/1979 | Dozzi et al. ..................... 260/448 R |
| 4,740,574 | 4/1988 | Bolt et al. ............................. 528/9 |
| 4,761,388 | 8/1988 | Oguri et al. .......................... 501/95 |

FOREIGN PATENT DOCUMENTS

| 839321 | 4/1970 | Canada . |
| 213629 | 3/1987 | European Pat. Off. . |
| 2096394 | 2/1972 | France . |
| 54-13439 | 5/1979 | Japan . |
| 124626 | 6/1986 | Japan . |
| 936544 | 9/1963 | United Kingdom . |

OTHER PUBLICATIONS

Bähr, Fiat, Rev. Ger. Sci., Inorg. Chem. II, pp 155-179 (1948).
Laubengayer et al., "Aluminum Nitrogen Polymers by Condensation Reactions", J. Amer. Chem. Soc. 83, pp. 542-546 (1961).
Laubengayer et al., "Aluminum-Nitrogen Polymers", Inorg. Chem. 1, pp. 632-637 (1962).
Cohen et al., "Complexes of Organoaluminum Compounds", J. Chem. Soc., pp. 1092-1096 (1965).
Interrante, Materials Research Society, Apr. 1986, Palo Alto, CA.
Gribkov et al., "Strength of Aluminum Nitride Whiskers", translated from Izvestiya Akad. Nauk SSR, Neorganicheskie Materialy, vol. 13(10), pp. 1775-1778 (1977).
Portnoi et al., "Role of Liquid Drops in the Growth . . .", translated from Izvestiya Akad. Nauk SSSR, Neorganicheskie Materialy, vol. 6(10), pp. 1762-1767 (1970).
Portnoi et al., "Growth of AlN Whiskers During Nitriding of Aluminum", translated from Poroshkovaya Metallurgivy No. 5(89), pp. 10-14 (1970).
Chem. Abstracts, vol. 89(20), Nov. 13, 1978, p. 120, abstract No. 165623f.

*Primary Examiner*—Harold D. Anderson

[57] ABSTRACT

An organoaluminum polymer formed from $R_3Al$ and dialkylaluminum amide that is useful for forming shaped articles of inorganic aluminum nitride alone or with nitrides (other than AlN), oxides, borides, carbides or combinations thereof; R being selected from hydrogen; $C_1$ to $C_{10}$ alkyl; halogen; and substituted or unsubstituted phenyl, naphthyl and biphenyl; no more than two of the R groups being alkyl.

12 Claims, No Drawings

MELT-FORMABLE ORGANOALUMINUM POLYMER

CROSS-REFERENCE TO RELATED APPLICATIONS

This is a continuation-in-part of copending application bearing U.S. Ser. No. 07/076,182 filed on July 27, 1987, now abandoned, which is a continuation-in-part of application bearing U.S. Ser. No. 06/903,448 filed on Sept. 4, 1986, now U.S. Pat. No. 4,696,968.

BACKGROUND OF THE INVENTION

Conversion of $(CH_3)_3Al$ and $NH_3$ to aluminum nitride is known: Bänr, FIAT, Rev. Ger. Sci., Inorg. Chem. II, 155 to 179 (1948). The reaction is as follows:

There is no suggestion that the $CH_3AlNH$ intermediate was isolated or that the final reaction step was conducted in the presence of ammonia.

Laubengayer et al., J. Amer. Chem. Soc., 83, pages 542 to 546 (1961), disclose the reactions of amines at low temperatures with aluminum alkyls or alkyl aluminum chlorides to form 1:1 addition compounds. When such addition compounds having N-H and Al-R bonding are pyrolyzed, amide aluminum polymers, imide aluminum polymers and aluminum nitride are produced.

Laubengayer et al., Inorg. Chem., 1, pages 632 to 637 (1962), disclose the reaction of triphenylaluminum and methylamine in toluene solution to form methylamine triphenylaluminum, then methylaminodiphenylaluminum, and then methyliminophenylaluminum. Triphenylaluminum and dimethylamine form dimethylamine triphenylaluminum which is heated to form dimethylaminodiphenylaluminum.

Cohen et al., J. Chem. Soc., pages 1092 to 1096 (1965), disclose that ethylaluminum dichloride and diethylaluminum chloride form complexes with ammonia. There is no ammonolysis of aluminum-chloride bonds. On heating, the complexes form aluminum-nitrogen polymers. They also disclose the reaction of $(C_2H_5)_3Al$ and $NH_3$, and conversion of the product to $C_2H_5AlNH$ which is substantially insoluble.

Interrante, in a meeting of the Materials Research Society, April, 1986, at Palo Alto, Calif., disclosed the conversion of $C_2H_5AlNH$ to aluminum nitride in the presence of ammonia. The aluminum nitride produced with ammonia contained less carbon than that formed without it. Interrante also disclosed that $C_2H_5AlNH$ is converted to aluminum nitride at 300° C. to 900° C. with retention of morphology.

Japanese Patent 54-13439 discloses a method for the production of aluminum nitride in the form of a powder. The method comprises purifying an organoaluminum compound followed by reacting it with ammonia or primary or secondary amines to prepare an aluminum nitride precursor having at least one aluminum nitrogen bond. The aluminum nitride precursor is converted to aluminum nitride by heating it above 400° C. in the presence of an inert gas, vacuum or ammonia gas.

Additional relevant background includes the following: Strength of Aluminum Nitride Whiskers, Gribkov et al., Izvestiya Akademii Nauk SSSR, Neorganicheskie Materialy, Vol. 13 (10) pages 1775 to 1778, (1977); Role of Liquid Drops in the Growth of Filamentary Crystals of Aluminum Nitride, Portnoi et al., Izvestiya Akademii Nauk SSSR, Neorganicheskie Materialy, Vol. 6 (10) pages 1762 to 1767 (1970); Growth of AlN Whiskers During the Nitriding of Aluminum, Portnoi et al., Poroshkovaya Metallurgiya No. 5 (89) pages 10 to 14 (1970).

Canada 839,321 discloses AlN by carbothermal reduction. Fibers made according to the method disclosed in this patent contain excessive amounts of carbon. Japan 61-124626 discloses a method for making AlN fibers from aluminum metal fibers or from solution of an aluminum compound. U.S. Pat. No. 3,846,527 and U.S. Pat. No. 4,010,233 make reference to metal nitride fibers. This route to AlN fibers uses the carbothermal reductive nitridation reaction with attendant problems of either excess O or C. U.S. Pat. No. 3,529,044 discloses aluminum carbide and that if nitrogen is used, then metal nitride fibers result. The problem with such fibers would be the presence of too much C or O. U.S. Pat. No. 3,658,979 discloses large diameter fibers with a thin film of AlN on the surface. EPA 213,629 discloses aluminum nitride fibers prepared by heating precursor fibers, spun from a solution of aluminum oxychloride and polyvinyl alcohol, in nitrogen. U.S. Pat. No. 4,740,574 discloses AlN structures made by pyrolyzing the condensation product of an organoaluminum compound and an aromatic amine.

SUMMARY OF THE INVENTION

This invention concerns a polymer comprising the reaction product of dialkylaluminum amide and $R_3Al$, said polymer having a mole fraction derived from $R_3Al$ between about 0.01 and 0.5. Polymer formation is accomplished by heating the dialkyl-aluminum amide and $R_3Al$ moieties at elevated temperatures, typically in the range of 100° to 200° C. with a preferred range of about 130° to 175°, for a time sufficient to effect polymer formation.

In the polymer of this invention, R is independently selected from hydrogen; $C_1$ to $C_{10}$ alkyl; halogen (Preferably chlorine or fluorine); phenyl; naphthyl; biphenyl; and phenyl, naphthyl and biphenyl substituted with halogen, $C_1$ to $C_{10}$ alkyl and $C_1$ to $C_{10}$ alkoxy; no more than two of the R groups being alkyl. When R is fluorine, it is most preferred that only one R is fluorine. Preferred alkyl substituents on the dialkylaluminum amide and the $R_3Al$ are independently selected from $C_2$ to $C_6$ with $C_2$ being the most preferred. This invention also concerns shaped articles, e.g., spheres and fibers formed from the polymer described above as well as composites containing said polymer.

This invention is defined with regard to reaction of dialkylaluminum amide with $R_3Al$ for the sake of brevity. Nevertheless, it has been found that the reaction product of this invention can be produced effectively with up to about one third of the alkyl component of the dialkylaluminum amide reactant replaced by one or a mixture of substituents selected from R. Thus, the term "dialkylaluminum amide" is intended to include reactants where up to one-third (molar basis) of the alkyl groups are replaced by R groups. It should be noted in this regard also that the term "dialkyl" includes mixed alkyl and mixed alkyl/R substituents on the amide so long as the R-derived fraction does not exceed about one-third of the total substitution on the $>AlNH_2$ moiety. In this regard also, it should be noted that methyl-substituted amides produce best results when the methyl substituent is maintained at about one-third or less of total substitution on the >AlNH$_2$ moiety.

DETAILS OF THE INVENTION

The R$_3$Al component (R=aryl) can be made, for example, by treatment of a trialkylaluminum with a triarylboron under conditions where alkyl and aryl exchange occurs. The dialkylaluminum amide component is made by reacting trialkylaluminum with ammonia according to the procedure of Cohen et al., J. Chem. Soc., pages 1092 to 1096 (1962). All reactants described herein are commercially available or can be made by the procedures described heretofore or can be made by other procedures known in the art. The polymer of this invention is made by combining R$_3$Al and dialkylaluminum amide (individually synthesized) in the proper molar ratio, and heating; or, by generating the desired molar ratio of R$_3$Al and dialkylaluminum amide, in situ, followed by heating.

The viscosity of the polymer varies with the reaction time and temperature as well as the quantity of R$_3$Al supplied to the system. The polymer can be made as a viscous liquid, or a glassy solid which is converted at temperatures above 40° C. to a viscous liquid. Fibers, even continuous fibers, can be drawn from the melt and cooled to ambient temperatures with retention of fiber morphology. Alternatively, fibers can be drawn from solutions, prepared by (i) dissolving the polymer in common organic solvents such as methylene chloride, n-hexane, cyclohexane, toluene, and the like, and then (ii) evaporating the solvent from the solution of polymer, with preservation of the fibrous morphology. Fibers also can be prepared by pulling with a glass rod dipped into the molten or dissolved polymer or by use of conventional melt-spinning or solution spinning equipment.

Treatment of the polymer in whatever form or shape with ammonia, hydrazine or similar nitrogen-containing compound cures it so that it is no longer fusible. One typical method for curing the polymer is to treat it in a stream of gas containing about 10% to 99% ammonia in nitrogen, or pure ammonia, at a pressure of about 1 mm to 10 atmospheres and at a temperature of about 50° C. to 175° C. Heating the cured polymer at about 800° to 1000° C. in the presence of ammonia, hydrazine or the like will convert it to high purity aluminum nitride. The density of the aluminum nitride so produced can be increased by heating it to about 1800° C. Shaped articles such as films, tapes, composites and the like, as well as fibers, can be prepared, cured and converted to aluminum nitride by the procedure described above.

The aluminum nitride prepared by the method of this invention is characterized by high density which, in a preferred embodiment, is substantially equivalent to the theoretical density of aluminum nitride. The range of oxygen contained in the aluminum nitride of this invention will generally not exceed about 0.5 weight percent and will typically be 0.1% or less. Accordingly, thermal conductivity will be very good, with values usually in excess of about 70 W/mK (watts/meter °K).

Utility and Composite Formation

Composites including shaped composites are formed by adding an inorganic nitride, oxide, boride, carbide or RAlNH to the polymer, forming the shaped article, curing the polymer and heating to form a shaped article of aluminum nitride or aluminum nitride containing a disparate inorganic nitride, an oxide, a boride, or a carbide component. Inorganic nitrides, oxides, borides, and carbides which can be used for composite preparation include SiO$_2$, Si$_3$N$_4$, SiC, TiC, ZrC, B$_2$O$_3$, BN, Al$_2$O$_3$, TiO$_2$, Mg$_2$Al$_4$Si$_5$O$_{18}$, TiB$_2$, ZrB$_2$ and ZrO$_2$, in addition to AlN. The amount of oxide, nitride, boride or carbide contained in the composite can be as high as 85% or more.

An alternative method for forming composites comprises adding an inorganic oxide or RAlNH to the polymer, forming the shaped article, exposing the shaped article to moisture to convert the polymer to Al(OH)$_3$, and heating at about 800° to 1800° C. to form a shaped article of alumina or alumina containing other inorganic oxides.

Films are prepared by applying a thin coating of the polymer on a substrate such as silicon metal, curing the polymer and heating at about 800° to 1800° C. to form a film of aluminum nitride on a substrate. Tapes are prepared by extruding the polymer from a die of appropriate thickness, curing, and heating at about 800° to 1800° to form tapes of aluminum nitride.

The polymer of this invention can be melt-shaped and converted to aluminum nitride of corresponding morphology by treatment in accordance with the foregoing description, or solubilized and shaped in accordance with liquid-handling techniques. The solvent can then be removed in any convenient manner and the polymer cured and converted to aluminum nitride.

The solutions can be spray-dried to produce polymer particles which can be cured and then heated to convert them to aluminum nitride of corresponding morphology. The polymer of this invention, in any of the nearly unlimited number of shapes in which it can be made, is combinable with other materials to form composites, reinforced materials, and the like. The shaped articles are useful in ceramic and heat conduction applications, especially in preparation of dense microcircuitry where heat generation is a problem.

The following Examples illustrate the invention. Procedures and reactions were conducted under an atmosphere of nitrogen or, where noted, ammonia or ammonia-nitrogen mixtures.

EXAMPLE 1

A mixture of (C$_2$H$_5$)$_2$AlNH$_2$, 2.5 g, and triphenylaluminum, AlPh$_3$, 0.13 g, was heated at 145° to 174° C. for 55 minutes. After the reaction period, the reaction mixture was cooled to 70° to 75° C., and fibers were pulled from the melt. By the general procedure provided heretofore, these fibers (and fibers drawn from the melt in each of the following Examples) can be converted into fibers of AlN.

EXAMPLES 2 to 16

In a drybox, (C$_2$H$_5$)$_2$AlNH$_2$, 0.5 g, was combined with the coreactants listed in the following Table in the amount specified. The mixtures were heated and tested for suitability as sources of organoaluminum fibers according to this procedure: a spatula was placed in the organoaluminum product at the synthesis temperature and was withdrawn from the product into the atmosphere of the drybox at ambient temperature. All of the reaction products formed from these coreactants were found to be acceptable fiber-forming, AlN-precursor compositions. Compositions formed from Et$_2$AlF were found to be acceptable fiber-formers only at the high end of the mole ratio of coreactant to dialkylaluminum amide; see Examples 14 and 15.

TABLE

| Example No. | Coreactant | Mole Fraction of Coreactant | Temp. (°C.) | Time (minutes) |
|---|---|---|---|---|
| 2 | AlCl$_3$ | 0.47 | 105-139 | 9 |
|   |   |   | 139-148 | 113 |
| 3 | AlCl$_3$ | 0.32 | 105-139 | 9 |
|   |   |   | 139-146 | 28 |
| 4 | AlCl$_3$ | 0.02 | 151-157 | 70 |
| 5 | Et$_2$AlCl | 0.47 | 153-172 | 180 |
| 6 | Et$_2$AlCl | 0.40 | 153-172 | 165 |
| 7 | Et$_2$AlCl | 0.02 | 153-172 | 71 |
| 8 | Et$_2$AlH | 0.47 | 148-169 | 290 |
| 9 | Et$_2$AlH | 0.40 | 148-163 | 35 |
| 10 | Et$_2$AlH | 0.02 | 148-169 | 80 |
| 11 | Ph$_3$Al | 0.47 | 145-170 | 128 |
| 12 | Ph$_3$Al | 0.40 | 145-170 | 128 |
| 13 | Ph$_3$Al | 0.02 | 145-170 | 50 |
| 14 | Et$_2$AlF | 0.47 | 146-156 | 220 |
| 15 | Et$_2$AlF | 0.34 | 146-156 | 130 |
| 16 | AlH$_3$ (as etherate) | 0.02 | 149-164 | 69 |

I claim:

1. A melt-formable polymeric reaction product of dialkylaluminum amide and R$_3$Al having a mole fraction derived from R$_3$Al between about 0.01 and 0.5, wherein R is individually selected from the group consisting of hydrogen; C$_1$ to C$_{10}$ alkyl; halogen; phenyl; napthyl; biphenyl; and phenyl, naphthyl and biphenyl substituted with C$_1$ to C$_{10}$ alkyl, C$_1$ to C$_{10}$ alkoxy, and halogen; no more than two of the R groups being alkyl.

2. A polymer according to claim 1 wherein alkyl substituents in the dialkylaluminum amide and R$_3$Al coreactants are independently selected from C$_2$ to C$_6$ alkyl.

3. A polymer according to claim 2 wherein the athyl alkyl substituent is C$_2$ alkyl.

4. A polymer according to claim 1 wherein at least one R is fluorine or chlorine.

5. A polymer according to claim 4 wherein one R is fluorine.

6. A polymer according to any one of claims 1 to 5 in the form of a viscous liquid.

7. A polymer according to any one of claims 1 to 5 in the form of a glassy solid.

8. A shaped article of the polymer according to any one of claims 1 to 5.

9. A fiber of the polymer according to any one of claims 1 to 5.

10. A method for making a fiber of the polymer according to any one of claims 1 to 5 comprising melt-forming a fiber from the polymer in a viscous liquid state.

11. A method for making a fiber of the polymer according to any one of claims 1 to 5 comprising forming a fiber from a solution of the polymer.

12. A spray-dried particle of a polymer according to any one of claims 1 to 5.

* * * * *